(12) United States Patent
Iino

(10) Patent No.: US 9,056,611 B2
(45) Date of Patent: Jun. 16, 2015

(54) ENGINE START CONTROL APPARATUS

(71) Applicant: SUZUKI MOTOR CORPORATION, Shizuoka (JP)

(72) Inventor: Hayato Iino, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 178 days.

(21) Appl. No.: 13/710,598

(22) Filed: Dec. 11, 2012

(65) Prior Publication Data
US 2013/0166122 A1    Jun. 27, 2013

(30) Foreign Application Priority Data

Dec. 21, 2011    (JP) ................................. 2011-280043

(51) Int. Cl.
*B60L 9/00*    (2006.01)
*B60L 11/00*    (2006.01)
*G05D 1/00*    (2006.01)
(Continued)

(52) U.S. Cl.
CPC ................ *B60W 20/106* (2013.01); *B60K 6/46* (2013.01); *Y10S 903/903* (2013.01); *B60W 10/06* (2013.01); *B60W 10/08* (2013.01); *B60W 2510/0676* (2013.01); *B60W 2510/085* (2013.01); *B60W 2510/244* (2013.01); *B60W 2510/246* (2013.01); *Y02T 10/6286* (2013.01); *Y02T 10/6217* (2013.01); *Y02T 10/48* (2013.01)

(58) Field of Classification Search
CPC ..... Y10S 903/903; Y10S 903/93; B60K 6/46; B60W 20/106; B60W 10/06; B60W 10/08; B60W 2510/085; B60W 2510/244; B60W 2510/246; Y02T 10/48; Y02T 10/6286; Y02T 10/6217

USPC .............. 701/22; 180/65.245, 65.28; 903/903
See application file for complete search history.

(56) References Cited

U.S. PATENT DOCUMENTS 7,467,033 B2 * 12/2008 Miller et al. ..................... 701/22
8,725,339 B2 * 5/2014 Justin et al. ..................... 701/22
(Continued)

FOREIGN PATENT DOCUMENTS

JP    2001-263120 A    9/2001

OTHER PUBLICATIONS

The First Office Action mailed Apr. 9, 2015 in corresponding Chinese Patent Application No. 201210489127.5 (with an English translation) (12 pages).

*Primary Examiner* — Calvin Cheung
*Assistant Examiner* — Paula L Schneider
(74) *Attorney, Agent, or Firm* — Rothwell, Figg, Ernst & Manbeck, P.C.

(57) ABSTRACT

An engine start control apparatus/method for a series hybrid vehicle is provided. The vehicle includes an engine, a motor/generator, a battery unit chargeable with electric power generated by the motor/generator, and a traction motor operable to receive electric power from the battery unit or motor/generator. A demanded power level is determined based on a sensed vehicle speed level and a sensed accelerator pedal position. A discharge capacity level of the battery unit is determined in terms of a power level available from the battery unit. The engine starting procedure is initiated upon the determined demanded power level reaching a predetermined relationship with the determined discharge capacity level so that the motor/generator is enabled to generate electric power before the determined demanded power level reaches the determined discharge capacity level.

9 Claims, 8 Drawing Sheets

(51) Int. Cl.
  *G05D 3/00*  (2006.01)
  *G06F 7/00*  (2006.01)
  *G06F 17/00* (2006.01)
  *B60W 20/00* (2006.01)
  *B60K 6/46*  (2007.10)
  *B60W 10/06* (2006.01)
  *B60W 10/08* (2006.01)

(56) References Cited

U.S. PATENT DOCUMENTS

| | | | |
|---|---|---|---|
| 2008/0125928 A1* | 5/2008 | Conlon et al. | 701/22 |
| 2010/0292880 A1* | 11/2010 | McGrogan et al. | 701/22 |
| 2011/0168467 A1* | 7/2011 | Kamen et al. | 180/65.245 |
| 2013/0274984 A1* | 10/2013 | Justin et al. | 701/22 |
| 2013/0332015 A1* | 12/2013 | Dextreit | 701/22 |

* cited by examiner

| ENGINE COOLANT TEMPERATURE (°C) | −20〜 | 0〜 | 20〜 | 40〜 |
|---|---|---|---|---|
| VARIABLE A | 7 | 5 | 2 | 2 |

| ENGINE COOLANT TEMPERATURE (°C) | −20〜 | 0〜 | 20〜 | 40〜 |
|---|---|---|---|---|
| VARIABLE B | 9 | 7 | 4 | 4 |

ENGINE START CONTROL APPARATUS

CROSS-REFERENCE

The present application claims priority to Japanese Patent Application NO. 2011-280043 filed on Dec. 21, 2011, the entire content of which is being incorporated herein by reference.

TECHNICAL FIELD

The present invention relates to an engine start control apparatus for a series hybrid vehicle.

BACKGROUND

In recent years, electric vehicles have been proposed and put to practical use for low-emission transportation. Among them are series hybrid vehicles. A typical series hybrid vehicle uses an internal combustion (IC) engine to make a generator to create electric power to be delivered to a traction motor. The traction motor powers the vehicle. The series hybrid electric vehicle is different from the other hybrid electric vehicles in that the engine power is delivered to the generator only for electric power generation and it is not delivered to the vehicle drive wheels for traction.

In Patent Literature 1 later mentioned, techniques are disclosed as follows: For the series hybrid vehicle, in order to prevent deterioration of the battery unit to used as the power supply for the traction motor, an allowable level or upper limit is set for electric power or current available from the battery unit, called, an allowable discharge capacity or current level, based on such conditions as the battery temperature and the battery voltage. In cold regions, the driver power demand may not be met because the allowable discharge capacity level is lowered due to a drop in the battery temperature.

In view of the above-mentioned driver's discomfort, the techniques disclosed in Patent Literature 1 attempt to meet the driver power demand by initiating the engine starting procedure upon or immediately after actual current level needed for powering the vehicle exceeds the allowable current level to cause the generator to create electric power and delivering the created power to the traction motor.

PRIOR ART

[Patent Literature] 1: JP-A 2001-263120

SUMMARY

However, Patent Literature does not address the issue of a delay from the engine start upon the actual current level exceeds the allowable current level to the beginning of power generation, called "an engine response delay." This delay, which may amount to several seconds, may cause the vehicle driver to have the inconsistent feeling because, during this delay, the driver power demand is not met.

An object of the present invention is to ensure the supply of electric power or current delivered to a traction motor for powering a series hybrid vehicle in accordance with the vehicle driver demand by conducting a control dealing with the engine response delay.

(1) According to one aspect of the present invention, there is provided an engine start control apparatus for a series hybrid vehicle. The series hybrid vehicle includes an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel. The engine start control apparatus includes: a vehicle speed sensor configured to sense a vehicle speed level for the series hybrid vehicle; an accelerator pedal position sensor configured to sense an accelerator pedal position for the series hybrid vehicle; a demanded power calculation function block configured to determine a demanded power level based on the sensed vehicle speed level and accelerator pedal position; a discharge capacity calculation function block configured to determine a discharge capacity level of the battery unit in terms of a power level available from the battery unit; and a control function block configured to initiate the engine starting procedure upon the determined demanded power level reaching a predetermined relationship with the determined discharge capacity level so that the motor/generator is enabled to generate electric power before the determined demanded power level reaches the determined discharge capacity level.

(2) According to another aspect, in addition to the matter specified in item (1), the control function block controls the timing to initiate the engine starting procedure in response to a predetermined factor which has an influence on the period of time required for the engine starting procedure.

(3) According to still another aspect, in addition to the matter specified in item (1), the control function block controls the timing to initiate the engine starting procedure in response to a predetermined factor which has an influence on the period of time required for the engine starting procedure. The engine start control apparatus further includes an engine coolant temperature sensor configured to sense a coolant temperature level for the engine. The predetermined factor is the sensed coolant temperature level.

(4) According to further aspect, in addition to the matter specified in item (1), the control function block controls the timing to initiate the engine starting procedure in response to a predetermined factor which has an influence on the period of time required for the engine starting procedure and the predetermined factor is the rate of change of the determined demanded power level.

(5) According to other aspect of the present invention, there is provided an engine start control apparatus for a series hybrid vehicle. The series hybrid vehicle includes an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel. The engine start control apparatus comprises: a speed sensor configured to sense a vehicle speed level for the series hybrid vehicle; an accelerator pedal position sensor configured to sense an accelerator pedal position for the said vehicle; a demanded power calculation function block configured to determine a demanded power level based on the sensed vehicle speed level and accelerator pedal position; a demanded driving current calculation function block configured to determine a demanded driving current level by dividing the determined demanded power level by voltage of the battery unit; an available current calculation function block configured to determine a current level available from the battery unit; and a control function block configured to initiate the engine starting procedure upon the determined demanded driving current level reaching a predetermined relationship with the determined current level so that the motor/generator is enabled to generate electric power before the determined demanded driving current level reaches the determined current level.

(6) According to further aspect, in addition to the matter specified in item (5), the control function block controls the timing to initiate the engine starting procedure in response to a predetermined factor which has an influence on the period of time required for the engine starting procedure.

(7) According to still further aspect, in addition the matter specified in item (5), the control function block controls the timing to initiate the engine starting procedure in response to a predetermined factor which has an influence on the period of time required for the engine starting procedure. The engine start control apparatus further includes an engine coolant temperature sensor configured to sense a coolant temperature level for the engine. The predetermined factor is the sensed coolant temperature level.

(8) According to other aspect, in addition to the matter specified in item (5), the control function block controls the timing to initiate the engine starting procedure in response to a predetermined factor which has an influence on the period of time required for the engine starting procedure and the predetermined factor is the rate of change of the determined demanded power level.

According to the aspects specified in items (1) and (5), the engine start control apparatus ensures the supply of power or current delivered to a traction motor for powering a series hybrid vehicle in accordance with the vehicle driver demand by conducting a control dealing with the engine response delay.

According to the aspects specified in items (2) and (6), the engine start control apparatus ensures supply of power high enough to meet the driver demand without any delay even under the circumstance where there is deterioration in the progress of the engine starting procedure, leading to the engine response delay.

According to the aspects specified in items (3) and (7), the engine start control apparatus ensures supply of power high enough to meet the driver demand without any delay even under the circumstance where there is deterioration in the progress of the engine starting procedure, leading to the engine response delay.

According to the aspects specified in items (4) and (8), the engine start control apparatus reduces fuel consumption because the engine starting procedure is completed just when the demanded power level or current level reach the discharge capacity level or current level available from the battery unit.

DETAILED DESCRIPTION

Embodiments of the present invention will now be described as follows:

First Embodiment

Figure 1:
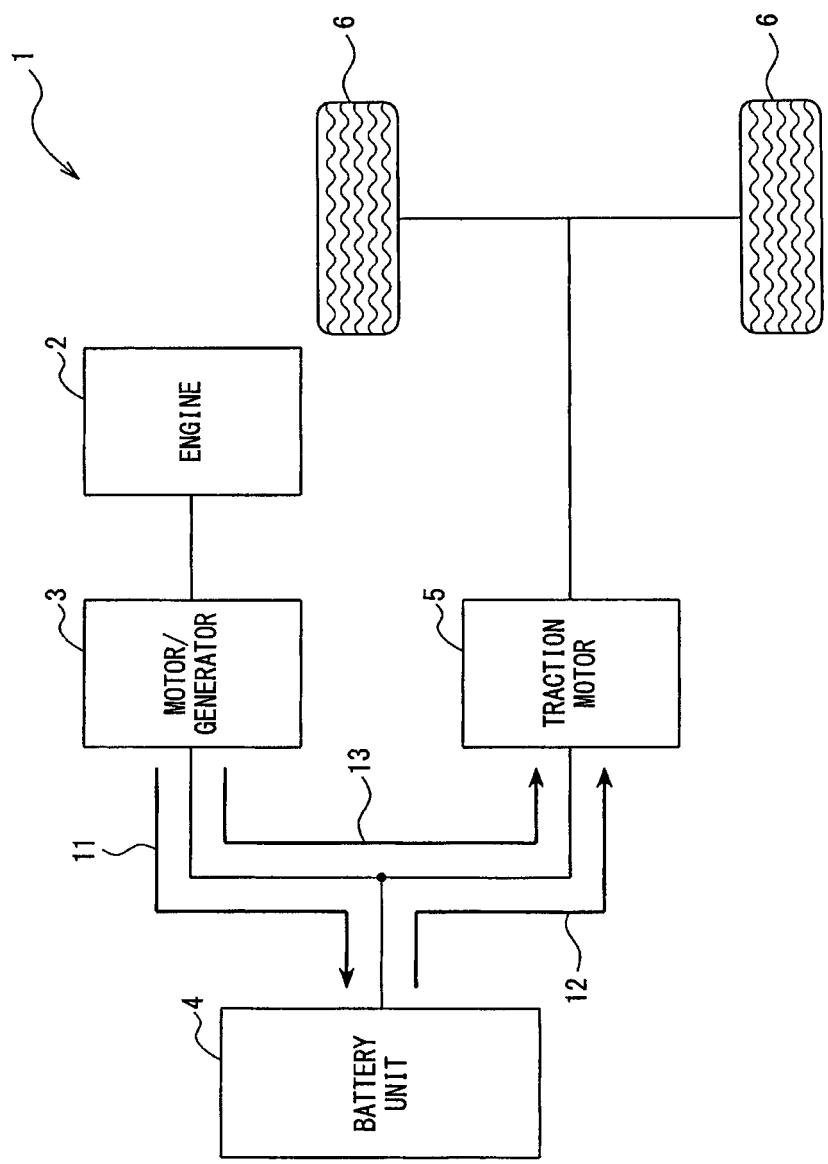
FIG. 1 is a schematic diagram showing the entire configuration for the vehicle to which the first embodiment of the present invention relates.

FIG. 1 is a schematic diagram showing the entire configuration for the vehicle to which the first embodiment of the present invention relates. The vehicle 1 is a series hybrid vehicle. The vehicle 1 include an engine 2, a motor/generator 3 operable to receive torque from the engine 2 to generate electric power, a battery unit 4 chargeable with electric power generated by the motor/generator 3, and a traction motor 5 operable to receive electric power from at least one of the battery unit 4 and motor/generator 3 to deliver driving power to the vehicle drive wheel(s) 6. In other words, as indicated by an arrow 11, the battery unit 4 is charged with the power generated by the motor/generator 3. Furthermore, as indicated by arrows 12 and 13, the traction motor 5 is driven by the power delivered from the battery unit 4 or the power delivered from the motor/generator 3.

Figure 2:
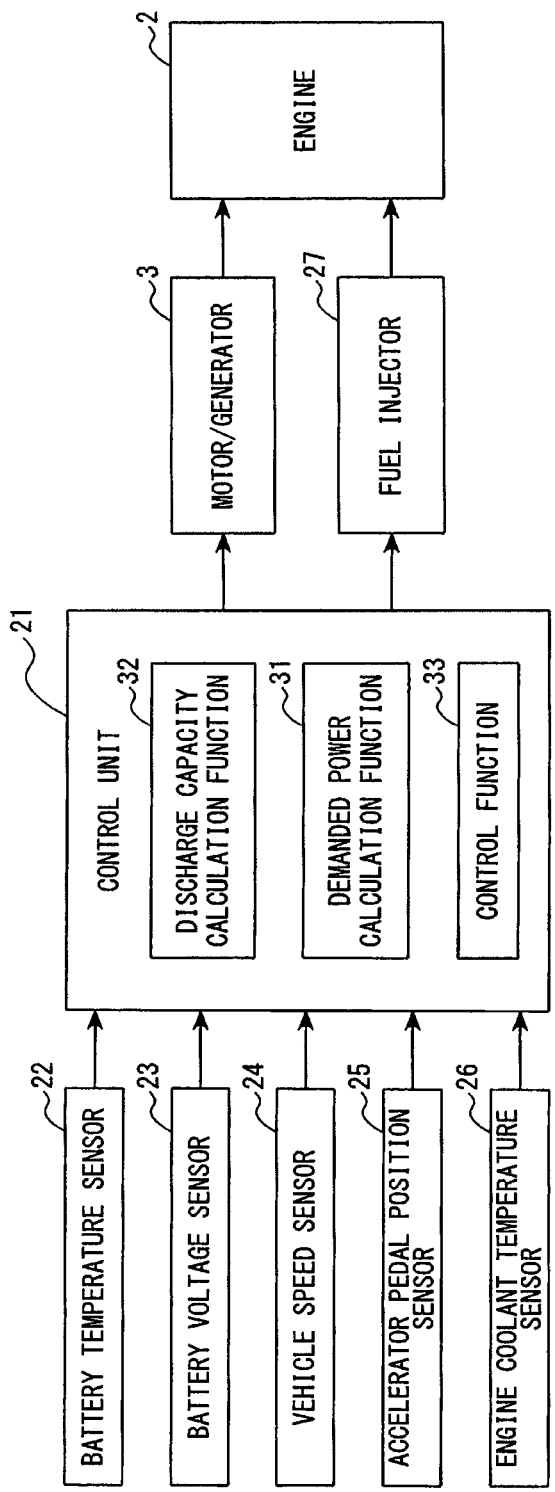
FIG. 2 is a block diagram showing electrically connected control systems for the engine start control apparatus installed in the vehicle to which the first embodiment of the present invention relates.

FIG. 2 is a block diagram showing the engine start control apparatus installed in the vehicle 1. A control unit 21 includes a microcomputer as its major component and performs various kinds of calculations to control each component or part exclusively. The control unit 21 is connected to a battery temperature sensor 22 configured to sense the temperature for the battery unit 4, the battery voltage sensor 23 configured to sense the voltage for the battery unit 4, a vehicle speed sensor 24 configured to sense the vehicle speed for the vehicle 1, an accelerator pedal position sensor 25 configured to sense the accelerator pedal position for the vehicle 1, an engine coolant temperature sensor 26 configured to sense the coolant temperature for the engine 2. The control unit 21 is connected also to the motor/generator 3, a fuel injector 27 for the engine 2. This allows the control unit 21 to control the motor/generator 3 and engine 2.

Next, the method which the control unit 21 performs is described with reference to the flowchart of FIG. 3. Firstly, in step S1, a demanded power level (DPL), which is indicative of a driver demanded level of power delivered to the traction motor 5, is determined in response to various states, such as a vehicle speed level sensed by the vehicle speed sensor 24 and an accelerator pedal position level for the vehicle 1 sensed by the accelerator pedal position sensor 25. This function makes a demanded power calculation function (DPCF) block 31 as one function of the control unit 21. A discharge capacity level (DCL) available from the battery unit 4, which is indicative of a power level available from the battery unit 4, is determined. This function makes a discharge capacity calculation function (DCCF) block 32 as one function of the control unit 21.

After the demanded power level (DPL) and discharge capacity level (DCL) are determined as above stated, it is determined whether or not the engine is operating (in step S2). If the engine is not operating, a path No from step 2 is chosen, and then it is determined whether or not the DPL is equal to or greater than a first reference level left by subtraction of a first variable A from the DCL (in step S3). The above-mentioned inquiry in step S3 may be expressed as DPL≥DCL−A? where DPL is the demanded power level, DCL the discharge capacity level available from the battery unit 4, A the first variable, and DCL−A the first reference level. If this is the case, a path "Yes" from step S3 is chosen, and the engine 2 start procedure is initiated in step S4. Step S2 and S3 make a control function block 33 as one function of the control unit 21.

However, if the engine 2 is operating, a path Yes from step 2 is chosen and it is determined whether or not the DPL is equal to or less than a second reference level left by subtraction of a second variable B from the DCL (in step S5). The above-mentioned inquiry in step S5 may be expressed as DPL≤DCL−B? where DPL is the demanded power level, DCL the discharge capacity level available from the battery unit 4, B the second variable, DCL−B the second reference level. If this is the case, a path "Yes" from step S5 is chosen and the engine 2 is stopped (in step S6).

Figures 3, 4, 5:
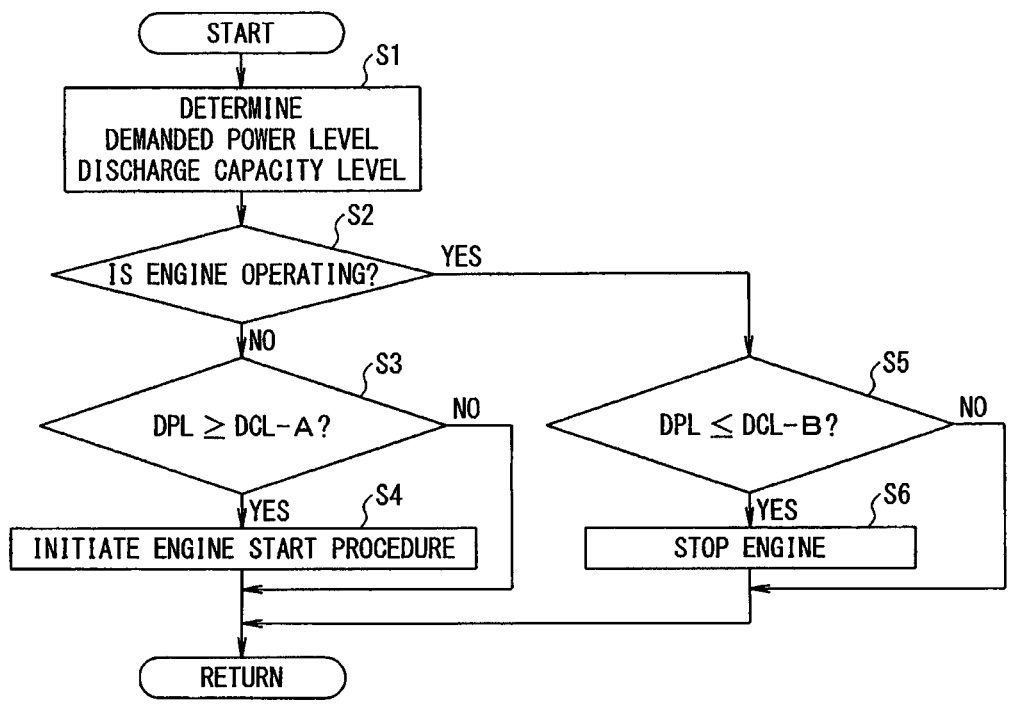
FIG. 3 is a flowchart showing the process operation of the engine start control apparatus installed in the vehicle to which the first embodiment of the present invention relates.
FIG. 4 is a table to be used to determine the variable A for the engine start control apparatus installed in the vehicle to which the first embodiment of the present invention relates.
FIG. 5 is a table to be used to determine the variable B for the engine start control apparatus installed in the vehicle to which the first embodiment of the present invention relates.

FIG. 4 is a table used to determine the first variable A and FIG. 5 is a table used to determine the second variable B. These lookup tables are used to determine the first variable A and the second variable B based on the engine coolant temperature level which is sensed by the engine coolant temperature sensor 25. According to these tables, when the engine coolant temperature for the engine 2 higher than or equal to minus 20 degrees centigrade (C.) but lower than 0 degree C., the first variable A is set to 7. When the engine coolant temperature is higher than or equal to 0 degree C. but lower than 20 degrees C., the first variable A is set to 5. When the engine coolant temperature is higher than or equal to 20 degrees C. but lower than 40 degrees C., the first variable A is set to 2. When the engine coolant temperature is higher than or equal to 40 degrees C., the first variable A is 2. The second variable B is set to a numerical quantity left by the addition of 2 to the numerical quantity of first variable A for each temperature category.

Figure 6:
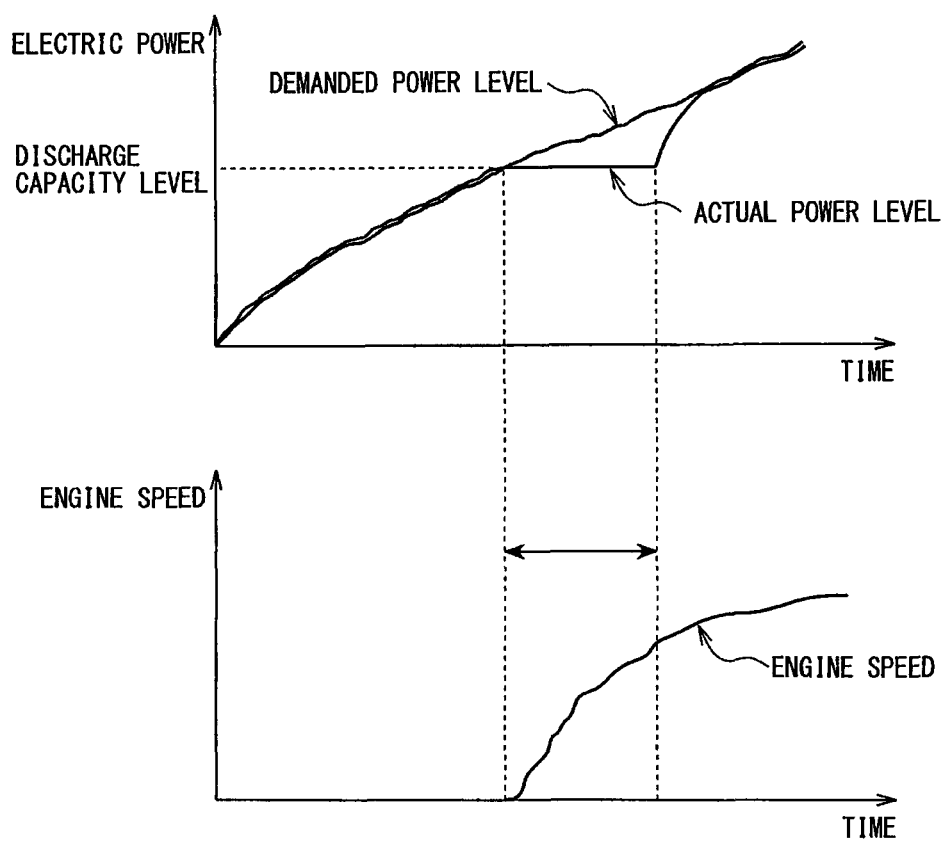
FIG. 6 is a graphical representation showing the output variation characteristics where the control function to which the present invention relates is not employed, for comparison.
Figure 7:
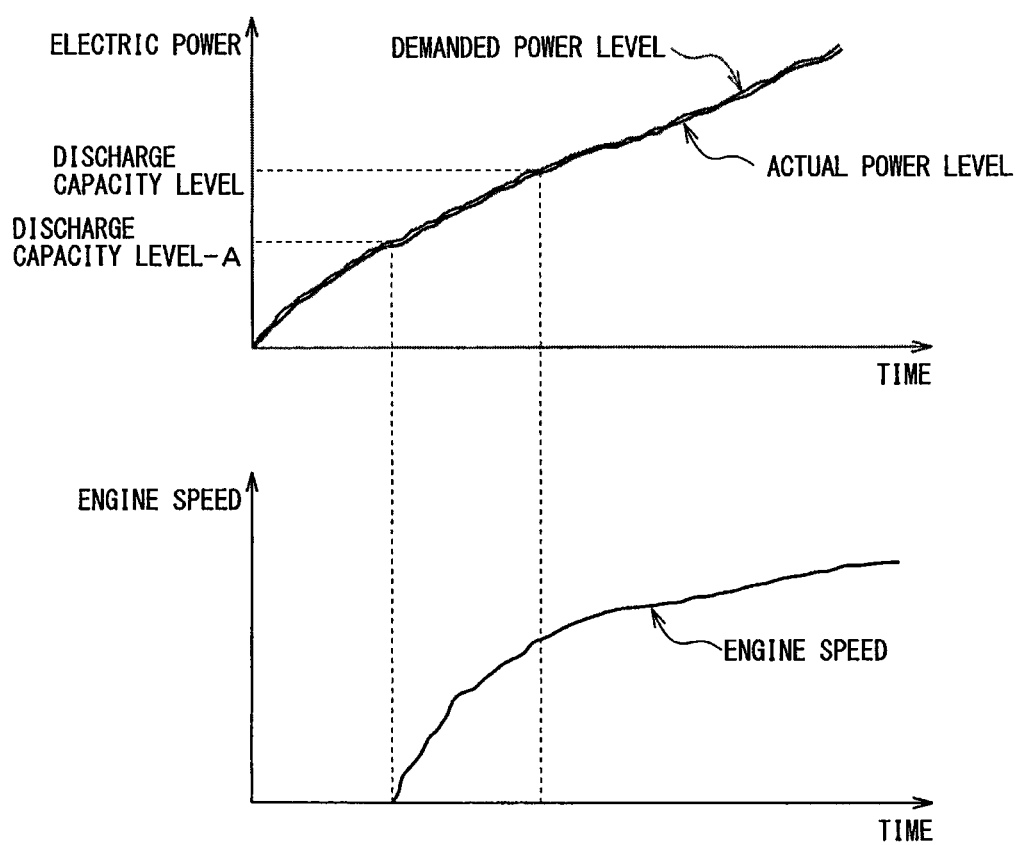
FIG. 7 is a graphical representation showing the output variation characteristics of the first embodiment to which the present invention relates.

FIG. 6 is a graphical representation showing the output variation characteristics provided by a comparative example for comparison with the first embodiment. FIG. 7 is a graphical representation showing the output variation characteristics after the first embodiment of the present invention is implemented. Each figure is the graphical representation showing a relationship between the demanded power and the time and a relationship between the actual supply power delivered to the traction motor 5 and the time, aligned with the graphical representation showing a relationship between the engine speed and the time.

The graphical representation in FIG. 6 is used for comparison with FIG. 7. It shows the output variation provided by the comparative example which is similar to the first embodiment but it is different from the first embodiment in that the subtractions using the first and second variables A and B are not made and modified inquiry DPL≥DCL? is used in step 3 and modified inquiry DPL≤DCL? in step 5. In this comparative example, the engine 2 start procedure is initiated for electric power generation by the motor/generator 3 immediately after the demanded power level exceeds the discharge capacity level available from the battery unit 4 in order to compensate for the lack of power level available from the battery unit 4. However, it takes some time to complete the engine starting procedure. Therefore, the actual power delivered to the traction motor 5 can not exceed the discharge capacity level available from the battery unit 4 during the period of time for engine starting procedure. This causes the difference between the demanded power level and the actual power delivered to the traction motor 5, which may cause the driver to have the inconsistent feeling. This event is derived from the response delay of the engine 2.

The graphical representation in FIG. 7 shows the output variation provide by the first embodiment where the subtraction of the first variable A from the discharge capacity level available from the battery unit 4 is made in step 3, i.e. DCL−A and the subtraction of the second variable B from the charge capacity level available from the battery unit 4 is made in step 5, i.e. DCL−B. The subtraction that DCL−A ensures that the engine starting procedure is initiated upon the demanded power level (DPL) reaching a predetermined relationship with the discharge capacity level (DCL) available from the battery unit 4 so that the motor/generator 3 is enabled to generate electric power before it reaches the discharge capacity level (DCL). The predetermined relationship is established when the DPL is equal to or greater than the first reference level, i.e. DCL−A. This causes the motor/generator 3 to quickly output electric power only by setting, as the first variable A, the proper value, allowing the level of power supplied to the traction motor 5 to closely follow the demanded power level (DPL). It follows that the driver is freed from having the inconsistence feel derived from a delay in meeting the demanded power level because there is no difference between the actual power level supplied to the traction motor 5 and the demanded power level (DPL). In other words, the control unit 21 controls the timing to initiate the engine starting procedure for the engine 2 so that the motor/generator 3 is enabled to generate electric power before the demanded power level (DPL) reaches the discharge capacity level (DCL).

With the first embodiment, the timing to initiate the engine starting procedure is controlled based on a predetermined factor in the form of the engine 2 coolant temperature. That is, the first variable A is set based on the engine 2 coolant temperature (see FIG. 4). In this way, the timing to initiate the engine starting procedure is controlled in response to the predetermined factor which has an influence on the period of time required for the engine starting procedure, which ensures the traction force enough to satisfy the demanded power level by the driver without any delay even under the conditions where the deteriorated engine start leads to the engine response delay.

The predetermined factor which has an influence on the period of time required for the engine starting procedure is not limited to the engine 2 coolant temperature. But, it is possible to use the time elapsed since the last stop of the engine 2 or the ambient temperature as the predetermined factor.

The step 5 and step 6 are included to eliminate the unnecessary engine idling after the vehicle 1 has been stopped because the engine 2 cannot stop running immediately after the driver releases the accelerator pedal once the engine starting procedure has been initiated in step 4. The numerical quantity of 2 is provided, as the difference between the first and second variable A and B, for each temperature category of coolant temperature for the engine 2. This is done to avoid the situation such as hunting of frequently repeated engine 2 start and stop because such situation may take place if the difference between the first and second variable A and B is too small.

Second Embodiment

Second embodiment of this invention will now be described. In the following description, since the same items as those in the first embodiment described with the reference to the FIGS. 1 to 7 are indicated by the same reference numerals, the detailed description on such items is hereby omitted.

Figure 8:
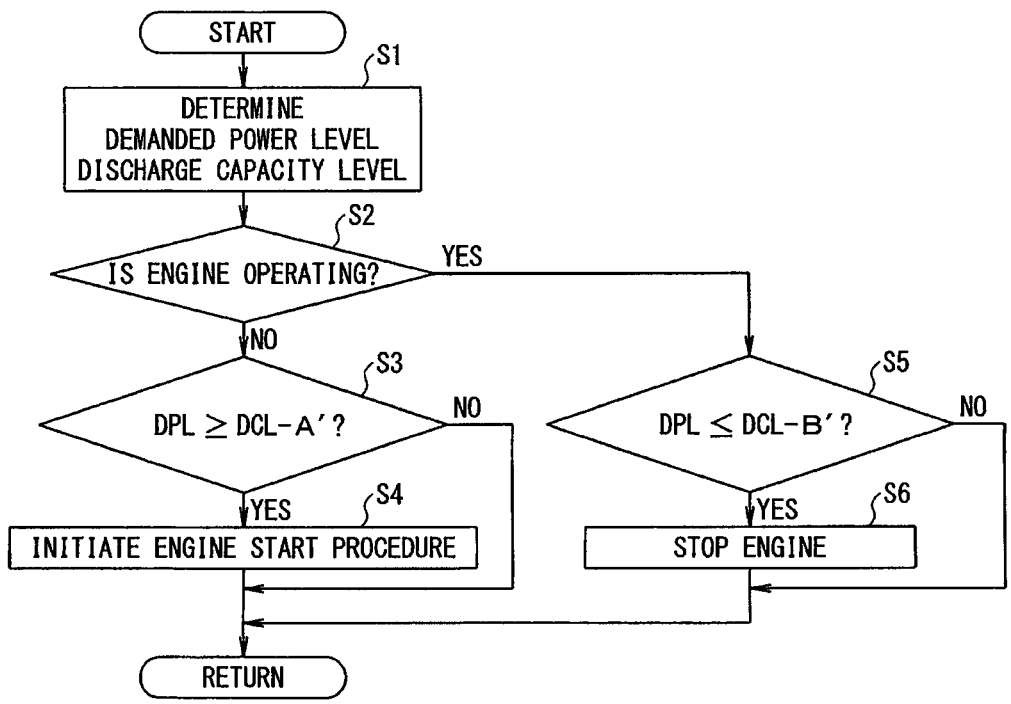
FIG. 8 is a flowchart showing the process operation of the engine start control apparatus installed in the vehicle to which the second embodiment of the present invention relates.

The second embodiment is substantially the same as the first embodiment except that, in the second embodiment, a third variable A' is used in place of the first variable A and a fourth variable B' the second variable B. In the second embodiment, a demanded power level (DPL) is determined for every predetermined amount of time. Then, "the variation of the demanded power level" is given by subtracting "the last determined demanded power level" from "the current determined demanded power level". Then, "the rate of change of the demanded power level" is given by dividing "the variation of the demanded power level" by "the current determined demanded power level". Now, the demanded power level which is used as the base for preparing the tables in FIGS. 4 and 5 is called "the basic rate of change". Based on this, a fifth variable C is given by dividing "the rate of change of the demanded power level" by "the basic rate of change", i.e. C=(the rate of change of the demanded power level)/(the basic rate of change). In addition, the third variable A' is determined as the product of the first variable A that is derived from the table of FIG. 4 and the fifth variable C, and the fourth variable B' is determined as the product of the second variable B that is derived from the table of FIG. 5 and the fifth variable C. For the second embodiment, the flowchart of FIG. 8 is used in place of that of FIG. 3 for the first embodiment described with the reference to the FIGS. 1 to 7. In FIG. 8, the third and fourth variables A' and B' are used, while, in FIG. 3, the first and second variables A and B are used. The third variable A' is determined in step S3 and the fourth variable B' is determined in step S5 in the flowchart of FIG. 8. Between the flowchart of FIG. 8 and that of FIG. 3, there is no difference other than the above. So, the detailed description is hereby omitted. According to the second embodiment, since the smaller the rate of change of the demanded power level, the longer the period of time required for the demanded power level to reach the discharge capacity level, the engine 2 starting procedure is initiated after the difference between the demanded power level and the discharge capacity level has become smaller as the rate of change of the demanded power level becomes smaller.

According to the second embodiment, it is ensured that the engine 2 starting procedure is completed at the timing when the demanded power level reaches the discharge capacity level available from the battery unit 4. Therefore, the engine 2 is refrained from running until the engine power is actually needed, leading to the reduced fuel consumption.

Figure 9:
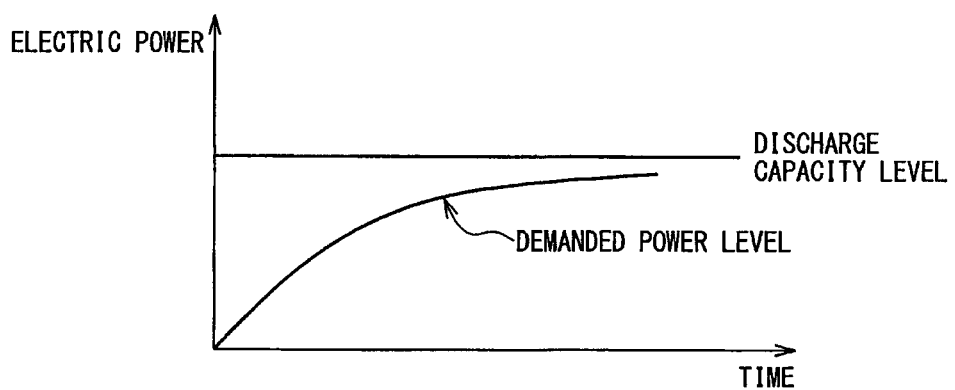
FIG. 9 is a graphical representation showing another application of the engine start control apparatus installed in the vehicle to which the second embodiment of the present invention relates.

If, in view of the rate of change of the demanded power level, the demanded power level is likely to stop growing or enter saturated condition as shown in FIG. 9 before the demanded power level reaches the discharge capacity lever available from the battery unit 4, the process to initiate the engine 2 starting procedure as in step S4 may be eliminated.

Third Embodiment

Third embodiment of this invention will now be described. In the following description, since the same items as those in the first embodiment described with the reference to the FIGS. 1 to 7 are indicated by the same reference numerals, the detailed description on such items is hereby omitted.

According to this third embodiment, the time $T_{DCL}$ required for a demanded power level (DPL) to reach a discharge capacity level (DCL) available from the battery unit 4, called "time-to-DCL", is compared to the period of time $T_{ES}$ required for the engine 2 starting procedure, called "engine-start-time". The engine 2 starting procedure is initiated based on this comparison. In the third embodiment, the demanded power level (DPL) is determined for every predetermined amount of time. Then, "the variation of the demanded power level" is given by subtracting "the last determined demanded power level" from "the current determined demanded power level" and expressed by the following formula:

(the variation of the demanded power level)=(the current determined demanded power level)−(the last determined demanded power level)

Lastly, the time $T_{DCL}$ required for the demanded power level (DPL) to reach the discharge capacity level (DCL) available from the battery unit 4 is estimated by calculating the following formula:

(the time $T_{DCL}$)=(the discharge capacity level−the demanded power level)/(the variation of the demanded power level), where: (the discharge capacity level)≥(the demanded power level) and, (the variation of the demanded power level)>0.

The period of time $T_{ES}$ for the engine 2 starting procedure varies depending on a factor, such as, coolant temperature for the engine 2 and time elapsed since the last stop of the engine 2. For example, the period of time $T_{ES}$ may be expressed as the product of a basic value and a coolant temperature dependent coefficient. The coolant temperature dependent coefficient may found by using a lookup table, which may be prepared in the same manner as the lookup table shown in FIG. 4 is prepared for use in the preceding embodiments. The basic value is a predetermined basic value of the period of time required for engine starting procedure for the engine 2.

Figure 10:
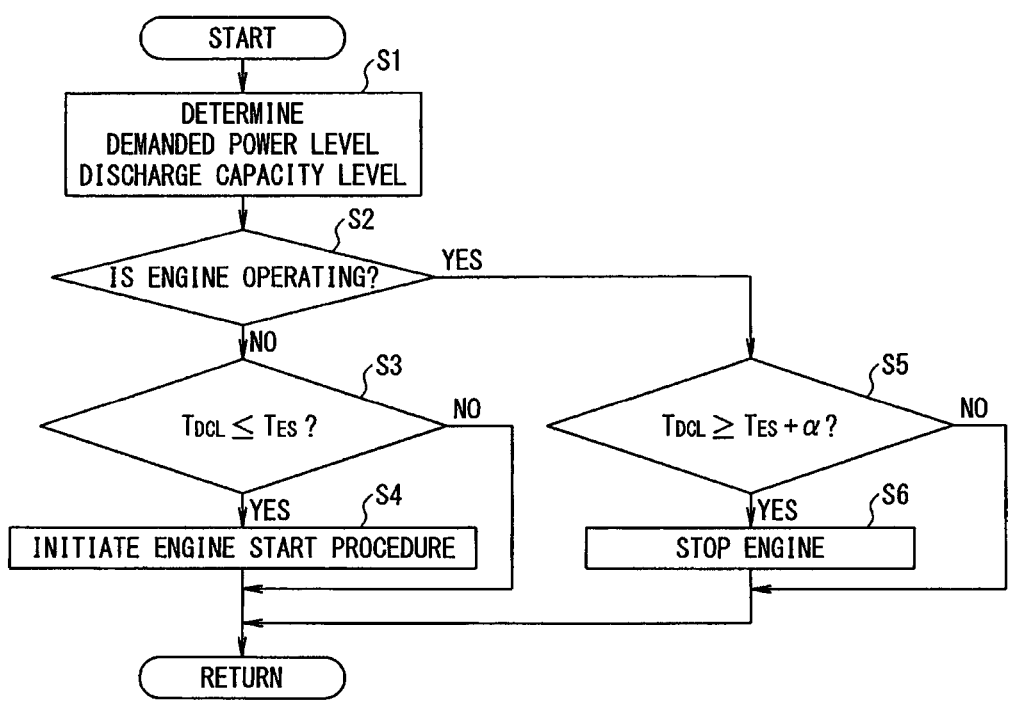
FIG. 10 is a flowchart showing the process operation of the engines start control apparatus installed in the vehicle to which the third embodiment of the present invention relates.

For the third embodiment, the flowchart of FIG. 10 is used in place of that of FIG. 3 for the first embodiment described with the reference to the FIGS. 1 to 7. Between the flowchart of FIG. 10 and that of FIG. 3, there is no difference other than inquiries specified in steps S3 and S5. In step S3 shown in FIG. 10, it is determined whether or not the time $T_{DCL}$ required for the demanded power level to reach the discharge capacity level available from the battery 4 is equal to or less than the period of time $T_{ES}$ for the engine starting procedure. If this is the case, the engine starting procedure for the engine 2 is initiated in step S4. In step S5 shown in FIG. 10, it is determined whether or not the time $T_{DCL}$ required for the demanded power level to reach the discharge capacity level is equal to or greater than the sum of the period of time $T_{ES}$ for the engine starting procedure and α (where: α is a predetermined value). If this is the case, the engine 2 is stopped in step S6. The detailed description is hereby omitted because there is no difference between the flowcharts shown in FIGS. 3 and 10 other than inquiries specified in steps S3 and S5.

Figure 11:
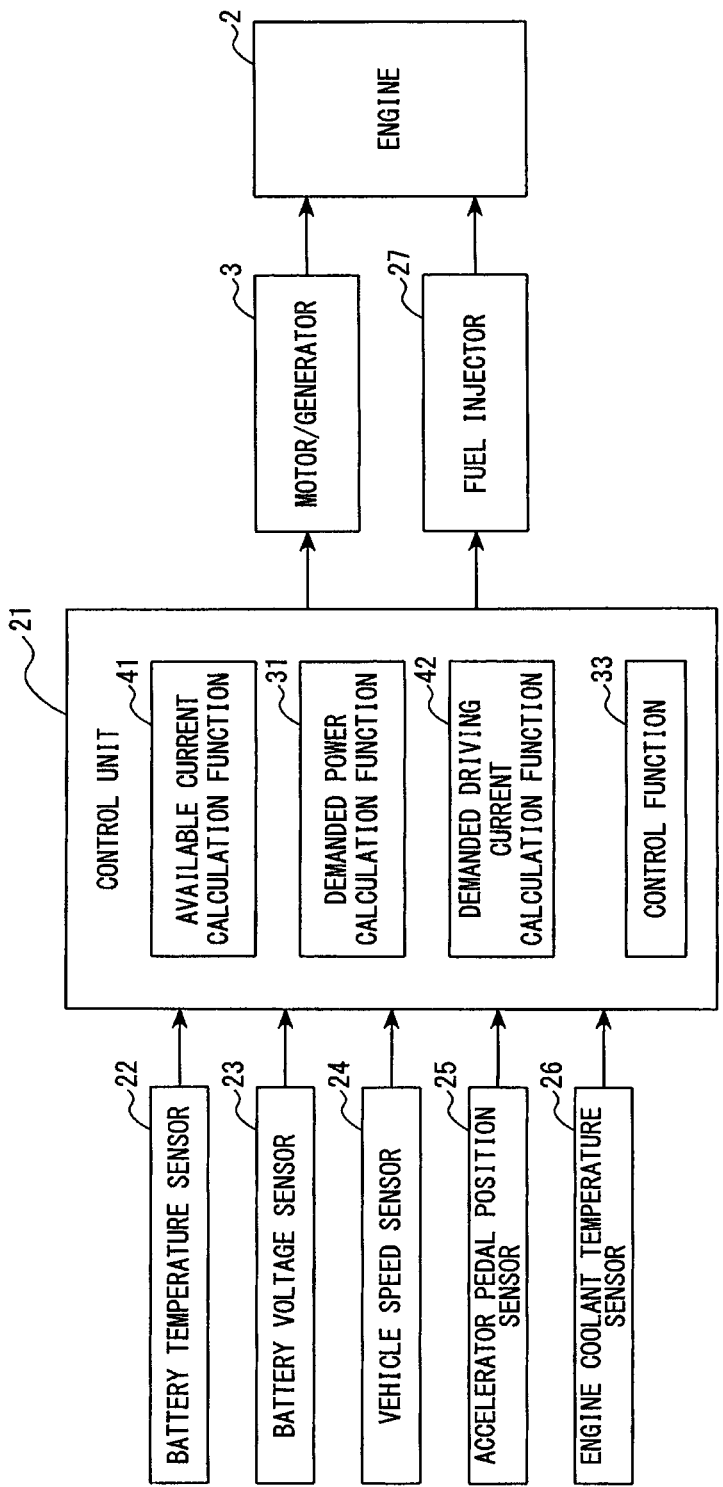
FIG. 11 is a block diagram showing another application of the engine start control apparatus installed in the vehicle to which the embodiments of the present invention relate.

In each of the embodiments in the foregoing description, the driver demanded discharge capacity indicative of electric power to be fed to the traction motor 5 is used for control, but it may be replaced by demanded driving current level indicative of electric current to be fed to the traction motor 5. In this case, current level available from the battery unit 4 is used for control in place of the discharge capacity level indicative of electric power level available from the battery unit 4.

Where the demanded driving current level and the current level available from the battery unit 4 are used, the control system shown in FIG. 11 is used in place of that in FIG. 2. In FIG. 11, a control unit 21 includes an available current calculation function block 41 in replace of the discharge capacity calculation function block 32 shown in FIG. 32. In addition, the control unit 21 includes a demanded driving current calculation function block 42. The demanded driving current calculation function block 42 is configured to calculate demanded electric current level by dividing the demanded power level given by the demanded power calculation function block 31 by voltage of the battery unit 4. The detailed description is hereby omitted because there is no any other differences between FIG. 2 and FIG. 11.

LIST OF REFERENCE NUMERALS

1 Vehicle
2 engine
3 motor/generator
4 battery unit
5 traction motor
24 vehicle speed sensor
25 accelerator pedal position sensor
31 demanded power calculation function block
32 discharge capacity calculation function block
33 control function block
41 available current calculation function block
42 demanded driving current calculation function block

What is claimed is:

1. An engine start control apparatus for a series hybrid vehicle including an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel, the engine start control apparatus, comprising:
a vehicle speed sensor configured to sense a vehicle speed level for the series hybrid vehicle;
an accelerator pedal position sensor configured to sense an accelerator pedal position for the series hybrid vehicle; and
a control unit, wherein the control unit is configured;
to determine a demanded power level based on the sensed vehicle speed level and accelerator pedal position;
to determine a discharge capacity level of the battery unit in terms of a power level available from the battery unit; and
to initiate an engine starting procedure upon the determined demanded power level reaching a predetermined relationship with the determined discharge capacity level so that the motor/generator is enabled to generate electric power before the determined demanded power level reaches the determined discharge capacity level,
wherein the predetermined relationship is established when the determined demanded power level is equal to or greater than a reference level left by subtracting from the determined discharge capacity level a predetermined variable indicative of a predetermined factor which has an influence on the period of time required for the engine starting procedure.

2. The engine start control apparatus according to claim 1, wherein the predetermined factor is coolant temperature for the engine.

3. An engine start control apparatus for a series hybrid vehicle including an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel, the engine start control apparatus, comprising:
a vehicle speed sensor configured to sense a vehicle speed level for the series hybrid vehicle;
an accelerator pedal position sensor configured to sense an accelerator pedal position for the series hybrid vehicle; and
a control unit, wherein the control unit is configured;
to determine a demanded power level based on the sensed vehicle speed level and accelerator pedal position;
to determine a discharge capacity level of the battery unit in terms of a power level available from the battery unit; and
to initiate an engine starting procedure upon the determined demanded power level reaching a predetermined relationship with the determined discharge capacity level so that the motor/generator is enabled to generate electric power before the determined demanded power level reaches the determined discharge capacity level,
wherein the predetermined relationship is established when the determined demanded power level is equal to or greater than a reference level left by subtracting from the determined discharge capacity level a product of a predetermined variable indicative of a predetermined factor which has an influence on the period of time required for the engine starting procedure and another predetermined variable, and
wherein the another predetermined variable being given by dividing the rate of change of the determined demanded power by a predetermined base rate of change.

4. The engine start control apparatus according to claim 3, wherein the predetermined factor is coolant temperature for the engine.

5. An engine start control apparatus for a series hybrid vehicle including an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel, the engine start control apparatus, comprising:
a vehicle speed sensor configured to sense a vehicle speed level for the series hybrid vehicle;
an accelerator pedal position sensor configured to sense an accelerator pedal position for the series hybrid vehicle; and
a control unit wherein the control unit is configured:
to determine a demanded power level based on the sensed vehicle speed level and accelerator pedal position;
to determine a discharge capacity level of the battery unit in terms of a power level available from the battery unit; and
to initiate an engine starting procedure upon the determined demanded power level reaching a predetermined relationship with the determined discharge capacity level so that the motor/generator is enabled to generate electric power before the determined demanded power level reaches the determined discharge capacity level,
wherein the predetermined relationship is established when time until the determined demanded power level becomes as high as the determined discharge capacity level is equal to or less than a period of time required for engine starting procedure;
wherein the time until the determined demanded power level becomes as high as the determined discharge capacity level is given by dividing a difference between the determined discharge capacity level and the determined demanded power level by the rate of change of the determined demanded power level; and wherein the period of time required for engine starting procedure is given by multiplying a predetermined reference value with a coefficient indicative of a predetermined factor which has an influence on the period of time required for engine starting procedure.

6. The engine start control apparatus according to claim 5, wherein the predetermined factor is coolant temperature for the engine.

7. The engine start control apparatus according to claim 5, wherein the predetermined factor is time elapsed since the last stop of the engine.

8. A method of controlling engine start for a series hybrid vehicle including an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel, the method comprising:

sensing a vehicle speed level for the series hybrid vehicle;

sensing an accelerator pedal position for the series hybrid vehicle;

determining a demanded power level based on the sensed vehicle speed level and accelerator pedal position;

determining a discharge capacity level of the battery unit in terms of a power level available from the battery unit; and initiating an engine starting procedure upon the determined demanded power level reaching a predetermined relationship with the determined discharge capacity level so that the motor/generator is enabled to generate electric power before the determined demanded power level reaches the determined discharge capacity level, wherein the predetermined relationship is established when the determined demanded power level is equal to or greater than a reference level given by subtracting from the determined discharge capacity level a predetermined variable indicative of a predetermined factor which has an influence on the period of time required for the engine starting procedure.

9. A method of controlling engine start for a series hybrid vehicle including an engine, a motor/generator operable to receive torque from the engine to generate electric power, a battery unit chargeable with electric power generated by the motor/generator, and a traction motor operable to receive electric power from at least one of the battery unit and motor/generator to deliver driving power to the vehicle drive wheel, the method comprising:

sensing a vehicle speed level for the series hybrid vehicle;

sensing an accelerator pedal position for the series hybrid vehicle;

determining a demanded power level based on the sensed vehicle speed level and accelerator pedal position;

determining a discharge capacity level of the battery unit in terms of a power level available from the battery unit; and initiating an engine starting procedure upon the determined demanded power level reaching a predetermined relationship with the determined discharge capacity level so that the motor/generator is enabled to generate electric power before the determined demanded power level reaches the determined discharge capacity level, wherein the predetermined relationship is established when the determined demanded power level is equal to or greater than a reference level given by subtracting from the determined discharge capacity level a product of a predetermined variable indicative of a predetermined factor which has an influence on the period of time required for the engine starting procedure and a second variable, and wherein the second variable being given by dividing the rate of change of the determined driver demanded power by a predetermined base rate of change.

* * * * *